(12) United States Patent
Yang (10) Patent No.: US 6,971,564 B2
(45) Date of Patent: Dec. 6, 2005

(54) LOCK FIXING DEVICE FOR BICYCLE

(76) Inventor: Cheng-Yi Yang, No. 110, Lane 200, Sec. 1, Dae Hsi Rd., Hsihu Chen, Changhua Hsien (TW)

(*) Notice: Subject to any disclaimer, the term of this patent is extended or adjusted under 35 U.S.C. 154(b) by 295 days.

(21) Appl. No.: 10/620,215

(22) Filed: Jul. 15, 2003

(65) Prior Publication Data

US 2005/0011921 A1    Jan. 20, 2005

(51) Int. Cl.[7] ............................................... B62J 11/00
(52) U.S. Cl. ...................... 224/425; 224/427; 224/431; 224/9
(58) Field of Search ............................... 224/427, 448, 224/425, 935, 431

(56) References Cited

U.S. PATENT DOCUMENTS

| | | | | |
|---|---|---|---|---|
| 5,386,961 A | * | 2/1995 | Lu | ......................... 248/223.41 |
| 5,405,113 A | * | 4/1995 | Jaw | .......................... 248/229.1 |
| 5,458,308 A | * | 10/1995 | Lin | ........................ 248/229.16 |
| 5,538,167 A | * | 7/1996 | Winner | ......................... 224/425 |
| 5,546,776 A | * | 8/1996 | Sun et al. | ...................... 70/233 |
| 5,704,526 A | * | 1/1998 | Kuo | .............................. 224/425 |
| 5,718,134 A | * | 2/1998 | Chang | .......................... 70/233 |
| 6,095,386 A | * | 8/2000 | Kuo | .............................. 224/448 |
| 6,619,084 B2 | * | 9/2003 | Kuo | .............................. 70/233 |

* cited by examiner

Primary Examiner—Tri M. Mai (74) *Attorney, Agent, or Firm*—Alan D. Kamrath; Nikolai & Mersereau, P.A.

(57) ABSTRACT

A lock fixing device includes a fastening seat, a support seat, a mounting tube, an elastic unit, a drive unit, and a C-shaped bushing. Thus, the inclined angle of the support seat relative to the fastening seat can be adjusted arbitrarily, thereby facilitating assembly and disassembly of the lock.

16 Claims, 10 Drawing Sheets

FIG. 14
PRIOR ART

# LOCK FIXING DEVICE FOR BICYCLE

BACKGROUND OF THE INVENTION

1. Field of the Invention

The present invention relates to a lock fixing device, and more particularly to a lock fixing device for a bicycle.

2. Description of the Related Art

A conventional lock fixing device for a bicycle in accordance with the prior art shown in FIGS. 11–14 comprises a main body 1 having a first end provided with a fastening seat 1a and a second end provided with a support seat 1b formed with a plurality of grooves 1c and two resting portions 1d, a washer 3 clamped in the fastening seat 1a, and a plug 2 mounted on the support seat 1b and formed with a clamping portion 2a, a plurality of first ribs 2b and a plurality of second ribs 2c.

In assembly, the washer 3 is mounted on the seat tube 4 of the bicycle, so that the main body 1 is mounted on the seat tube 4 of the bicycle. Then, the plug 2 is clamped on the bar 5a of the lock 5 of the bicycle. Then, the plug 2 is mounted on the support seat 1b. At this time, the first ribs 2b and the second ribs 2c are inserted into the grooves 1c of the support seat 1b, and the periphery of the plug 2 is pressed by the two resting portions 1d, so that the plug 2 together with the bar 5a of the lock 5 is fixed on the support seat 1b of the main body 1.

However, the inclined angle of the support seat 1b of the main body 1 is fixed and cannot be adjusted, thereby causing inconvenience of assembly and disassembly of the lock 5. In addition, the plug 2 together with the bar 5a of the lock 5 is easily loosened and detached from the support seat 1b of the main body 1 during a long-term utilization.

SUMMARY OF THE INVENTION

The primary objective of the present invention is to provide a lock fixing device, wherein the inclined angle of the support seat relative to the fastening seat can be adjusted arbitrarily, thereby facilitating assembly and disassembly of the lock.

Another objective of the present invention is to provide a lock fixing device, wherein the positioning blocks of the support seat are positioned in the positioning recesses of the mounting tube and the locking rib of the drive handle of the drive unit is locked in the positioning groove of the mounting tube, so that the mounting tube is fixed on the support seat rigidly and stably without detachment.

A further objective of the present invention is to provide a lock fixing device, wherein after the mounting tube is inserted into the tubular body of the support seat, the mounting tube can be rotated relative to the support seat to a determined angle, thereby facilitating assembly and disassembly of the lock.

A further objective of the present invention is to provide a lock fixing device, wherein each of the two dovetailed ribs of the C-shaped bushing is secured in a respective one of the two dovetailed grooves of the first clamping plate of the fastening seat, so that the C-shaped bushing is combined with the fastening seat rigidly and stably without detachment.

In accordance with the present invention, there is provided a lock fixing device, comprising a fastening seat, a support seat, a mounting tube, an elastic unit, a drive unit, and a C-shaped bushing, wherein:

the fastening seat includes a first clamping plate having an outer periphery formed with an outer tube, and a second clamping plate combined with the first clamping plate;

the support seat is mounted on the fastening seat and includes a tubular body and an inner tube extended from an outer wall of the tubular body and rotatably mounted in the outer tube of the fastening seat;

the mounting tube is movably mounted on the tubular body of the support seat;

the elastic unit is mounted between the fastening seat and the support seat;

the drive unit is mounted on the support seat and includes a drive handle pivotally mounted on the tubular body of the support seat; and the C-shaped bushing is mounted in the fastening seat.

Further benefits and advantages of the present invention will become apparent after a careful reading of the detailed description with appropriate reference to the accompanying drawings.

DETAILED DESCRIPTION OF THE INVENTION

Referring to the drawings and initially to FIGS. 1–7, a lock fixing device in accordance with the preferred embodiment of the present invention comprises a fastening seat 10, a support seat 20, a mounting tube 30, an elastic unit 40, a drive unit 50, and a C-shaped bushing 60.

Figure 3:
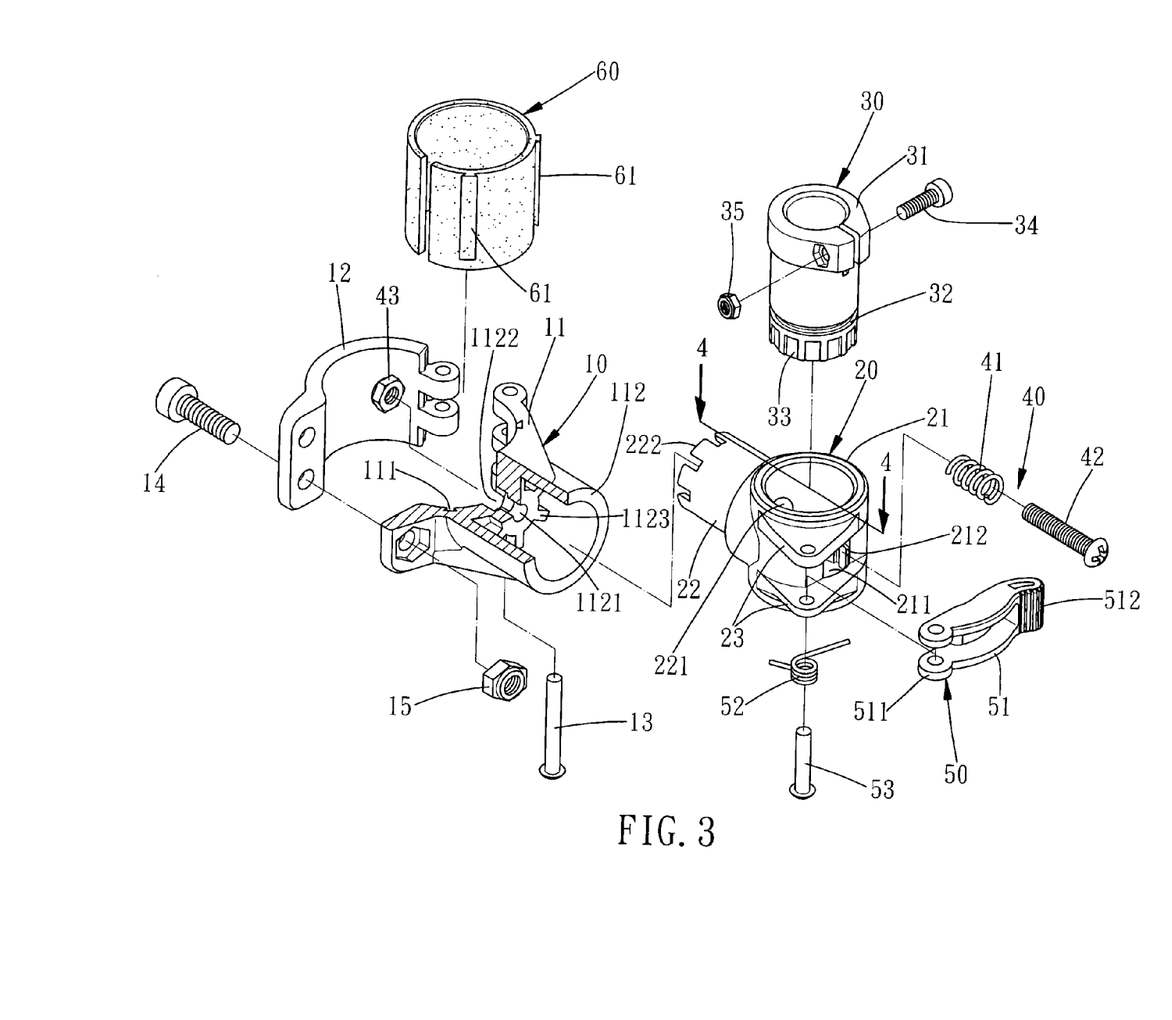
FIG. 3 is an exploded perspective view of the lock fixing device in accordance with the preferred embodiment of the present invention.
Figure 4:
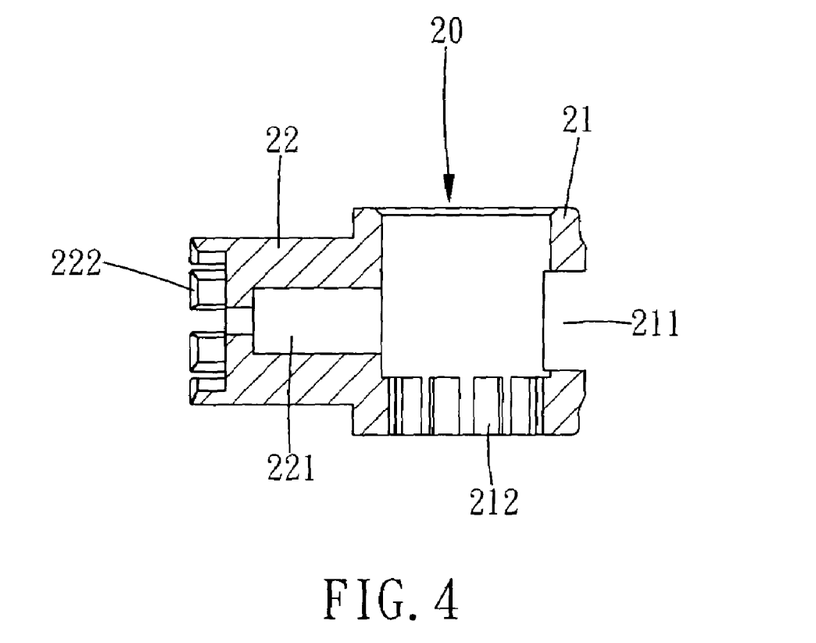
FIG. 4 is a partially cut-away plan cross-sectional view of the lock fixing device taken along line 4—4 as shown in FIG. 3.
Figure 5:
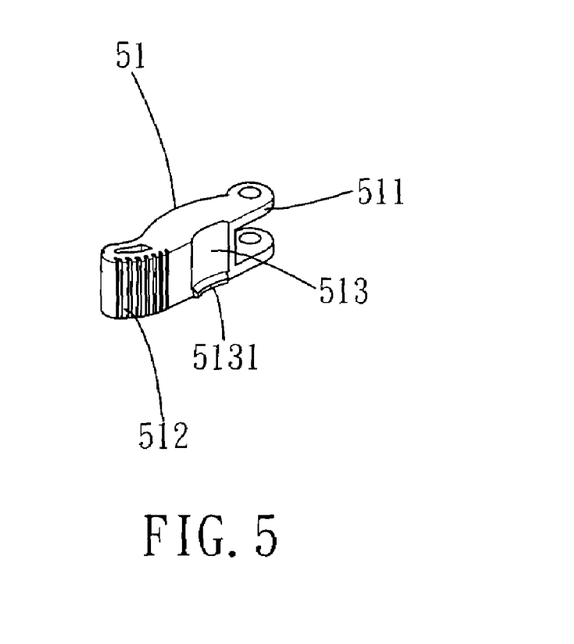
FIG. 5 is a perspective view of a drive handle of the lock fixing device in accordance with the preferred embodiment of the present invention.
Figure 6:
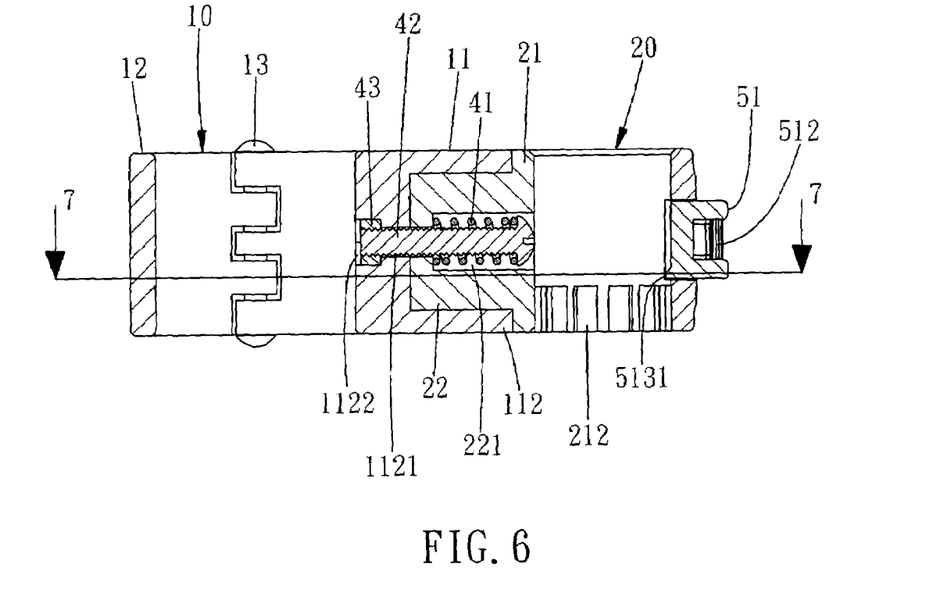
FIG. 6 is a side plan cross-sectional assembly view of the lock fixing device as shown in FIG. 3.
Figure 7:
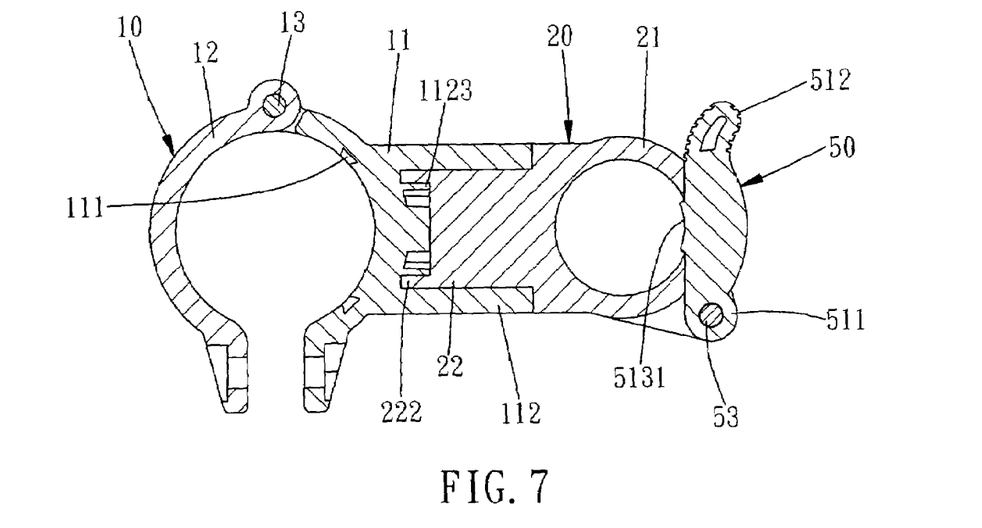
FIG. 7 is a plan cross-sectional view of the lock fixing device taken along line 7—7 as shown in FIG. 6.

The fastening seat 10 includes an arc-shaped first clamping plate 11, and an arc-shaped second clamping plate 12 combined with the first clamping plate 11. The second clamping plate 12 has a first end pivotally mounted on a first end of the first clamping plate 11 by a pivot pin 13 and a second end fixedly mounted on a second end of the first clamping plate 11 by bolts 14 and nuts 15. The first clamping plate 11 has an inner periphery formed with two longitudinal dovetailed grooves 111, and an outer periphery integrally formed with an outer tube 112. The outer tube 112 of the fastening seat 10 has an inner portion formed with a circular hole 1121 communicating with the outer tube 112 and a hexagonal hole 1122 communicating with the circular hole 1121 and the inner periphery of the first clamping plate 11. The inner portion of the outer tube 112 of the fastening seat 10 has a periphery provided with a plurality of equally spaced protruding positioning teeth 1123.

The support seat 20 is mounted on the fastening seat 10 and includes a tubular body 21 and an inner tube 22 extended from an outer wall of the tubular body 21 and rotatably mounted in the outer tube 112 of the fastening seat 10. The tubular body 21 of the support seat 20 has a periphery formed with a through hole 211. The outer wall of the tubular body 21 of the support seat 20 is formed with two pivot ears 23, and the through hole 211 is located between the two pivot ears 23. The tubular body 21 of the support seat 20 has an inner wall having a lower section formed with a plurality of equally spaced protruding positioning blocks 212 located under the through hole 211. The inner tube 22 of the support seat 20 has an inner portion formed with a stepped hole 221 communicating with the circular hole 1121 of the outer tube 112 of the fastening seat 10 and facing the through hole 211 of the tubular body 21. The inner tube 22 of the support seat 20 has an end face having a periphery provided with a plurality of equally spaced protruding positioning teeth 222 meshing with the positioning teeth 1123 of the outer tube 112 of the fastening seat 10 in a staggered manner.

The mounting tube 30 is movably mounted on the tubular body 21 of the support seat 20. The mounting tube 30 has an upper section formed with a C-shaped clamping portion 31 and a lower section having a periphery formed with an annular positioning groove 32 and a plurality of equally spaced positioning recesses 33 located under the positioning groove 32 to receive the positioning blocks 212 of the tubular body 21 of the support seat 20.

The elastic unit 40 is mounted between the fastening seat 10 and the support seat 20. The elastic unit 40 includes a locking nut 43 mounted in the hexagonal hole 1122 of the outer tube 112 of the fastening seat 10, a locking bolt 42 extended through the stepped hole 221 of the inner tube 22 of the support seat 20 and the circular hole 1121 of the outer tube 112 of the fastening seat 10 and screwed into the locking nut 43 so that the fastening seat 10 is combined with the support seat 20, and a compression spring 41 mounted on the locking bolt 42 and urged between a wall of the stepped hole 221 of the inner tube 22 of the support seat 20 and a head of the locking bolt 42.

The drive unit 50 is mounted on the support seat 20 and includes a drive handle 51 pivotally mounted on the tubular body 21 of the support seat 20. The drive handle 51 of the drive unit 50 has a mediate section having an inner side formed with an arcuate recess 513 (see FIG. 5). The arcuate recess 513 of the drive handle 51 of the drive unit 50 has a lower portion provided with an arcuate tapered protruding locking rib 5131 extended into the through hole 211 of the tubular body 21 and locked in the positioning groove 32 of the mounting tube 30. The drive handle 51 of the drive unit 50 has a first end provided with two pivot plates 511 pivotally mounted between the two pivot ears 23 of the tubular body 21 of the support seat 20 by a pivot shaft 53 and a second end provided with an operation portion 512. The drive unit 50 further includes a torsion spring 52 mounted on the pivot shaft 53 and having a first end urged on the drive handle 51 and a second end urged on the tubular body 21 of the support seat 20.

The C-shaped bushing 60 is mounted in the fastening seat 10 and has an outer wall formed with two longitudinal dovetailed ribs 61 each secured in a respective one of the two dovetailed grooves 111 of the first clamping plate 11 of the fastening seat 10.

Figure 1:
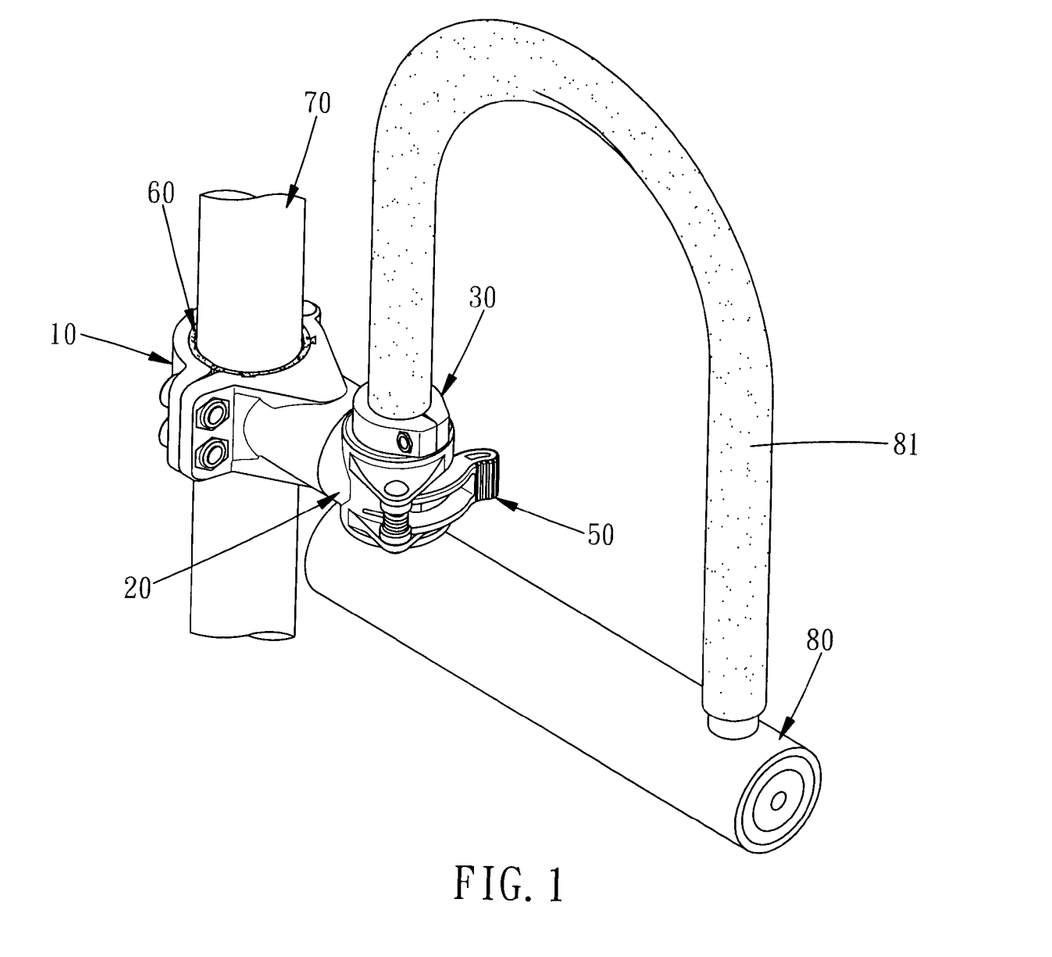
FIG. 1 is a perspective view of a lock fixing device in accordance with the preferred embodiment of the present invention.
Figure 2:
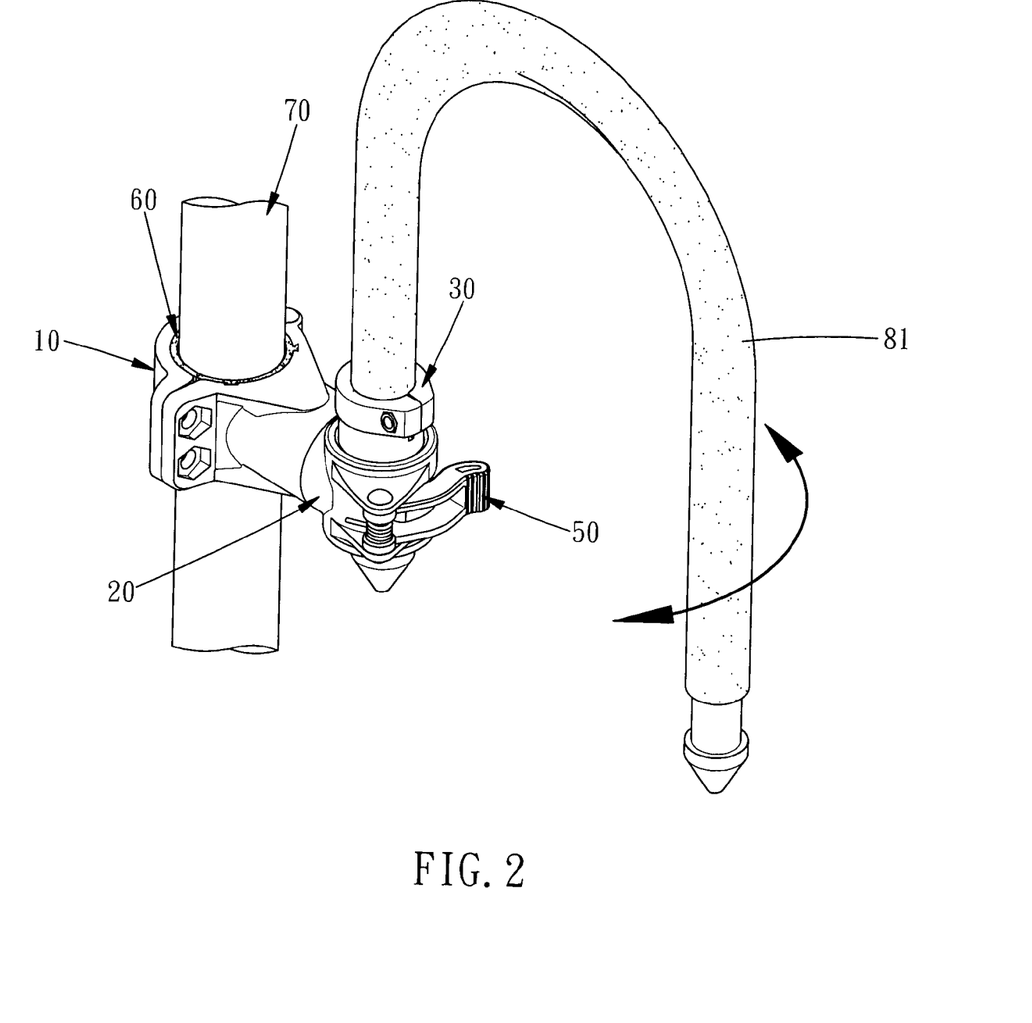
FIG. 2 is a perspective view of the lock fixing device in accordance with the preferred embodiment of the present invention.
Figure 8:
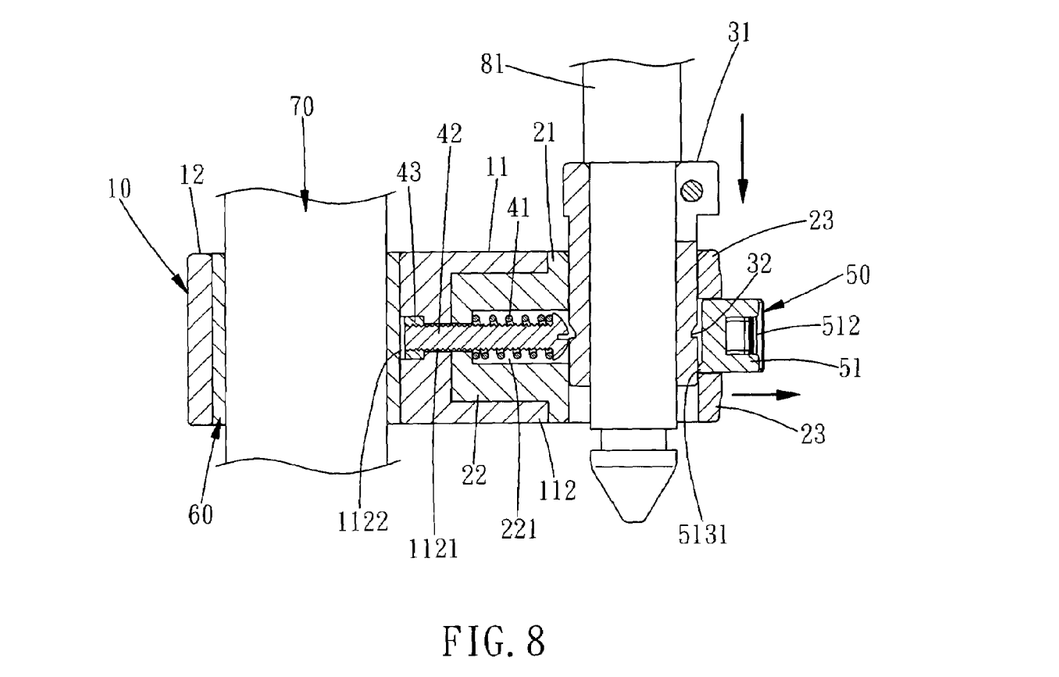
FIG. 8 is an assembly view of the lock fixing device as shown in FIG. 6.
Figure 9:
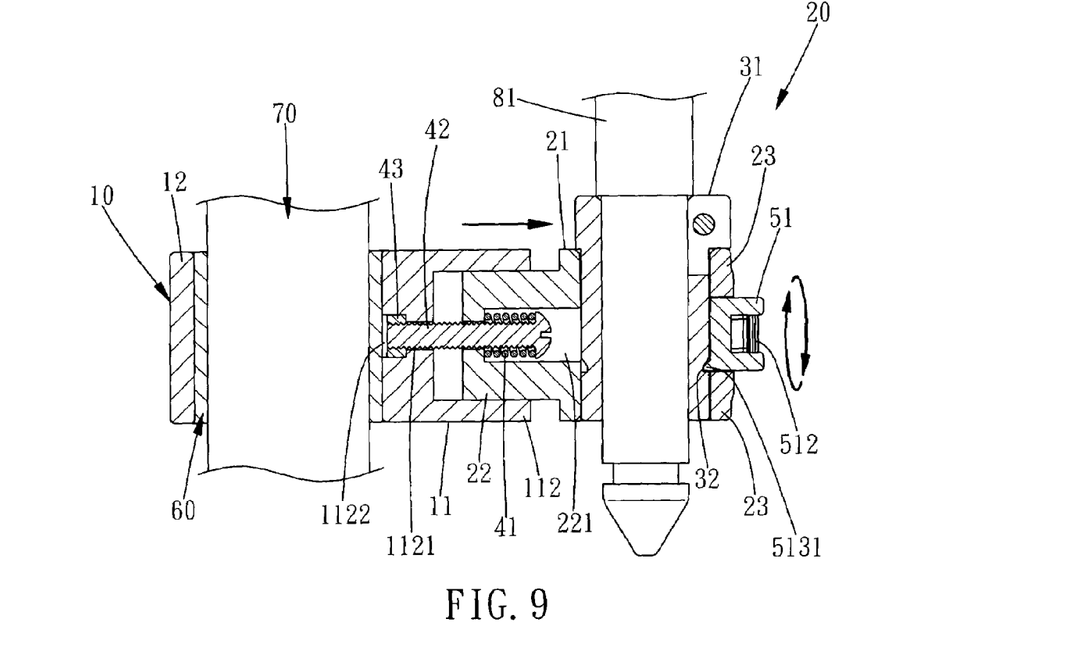
FIG. 9 is a schematic operational view of the lock fixing device as shown in FIG. 8.
Figure 10:
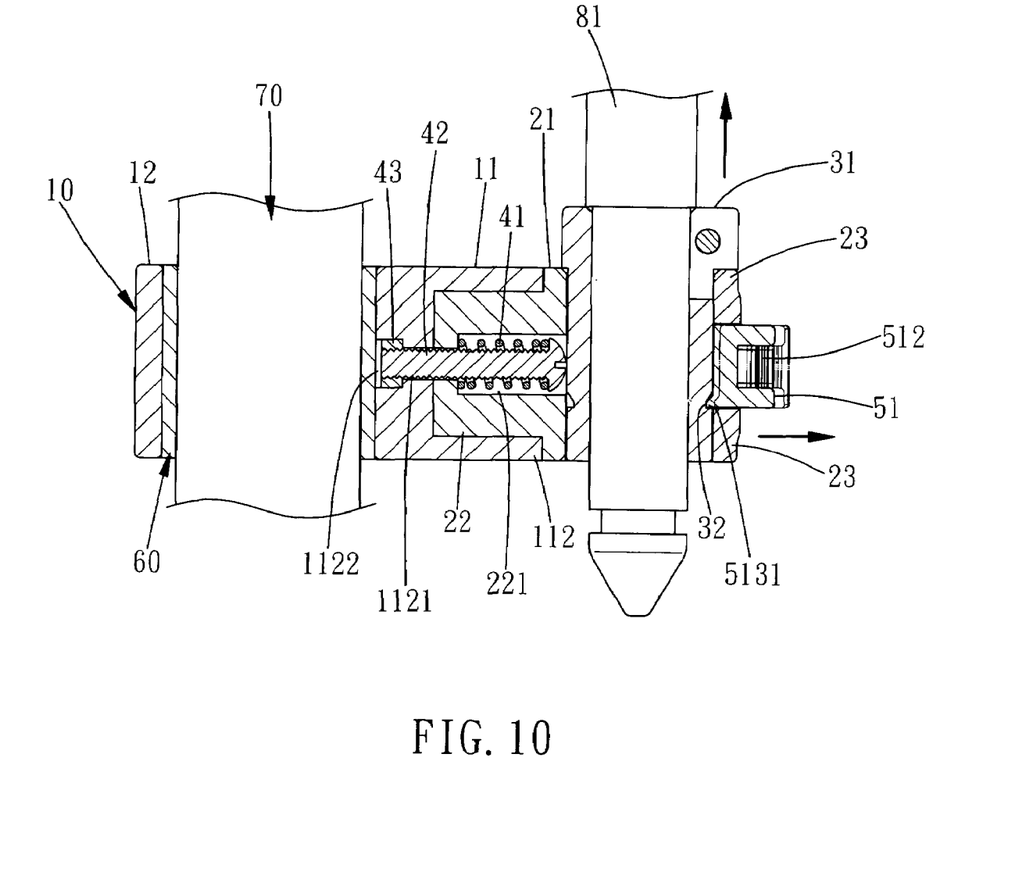
FIG. 10 is a schematic operational view of the lock fixing device as shown in FIG. 9.
Figure 11:
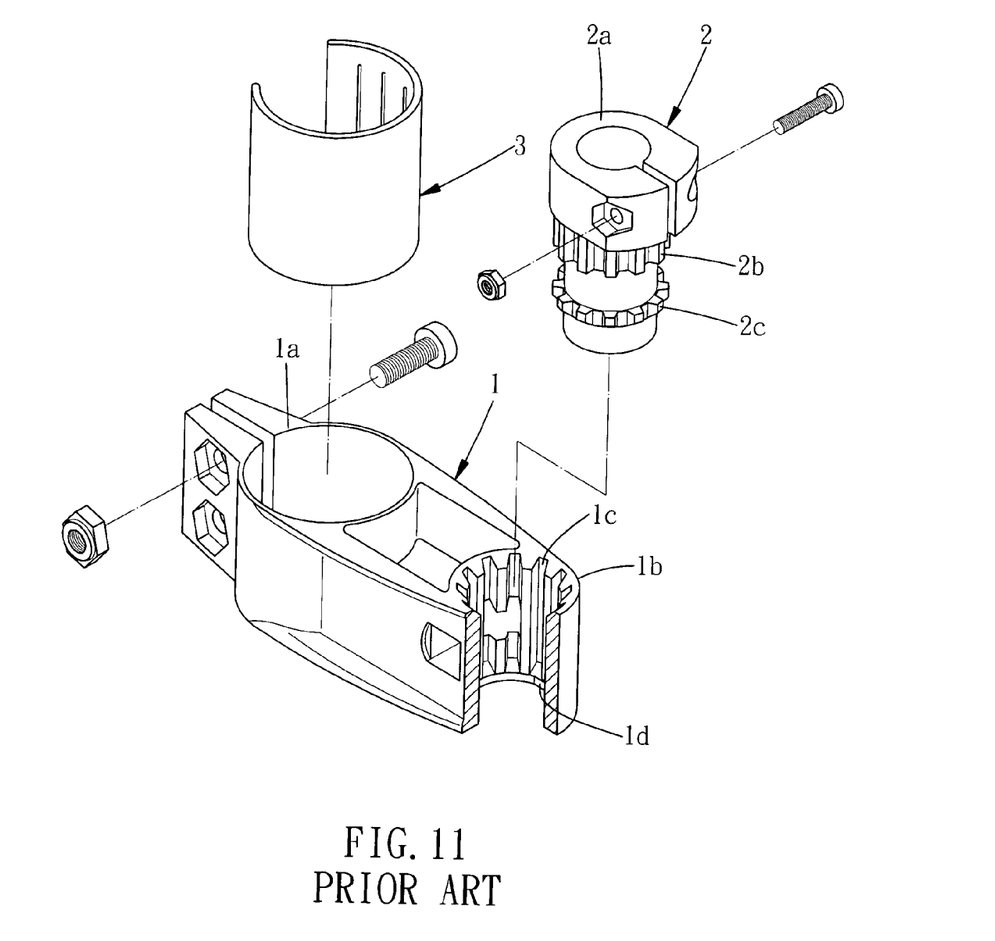
FIG. 11 is an exploded perspective view of a conventional lock fixing device in accordance with the prior art.
Figure 12:
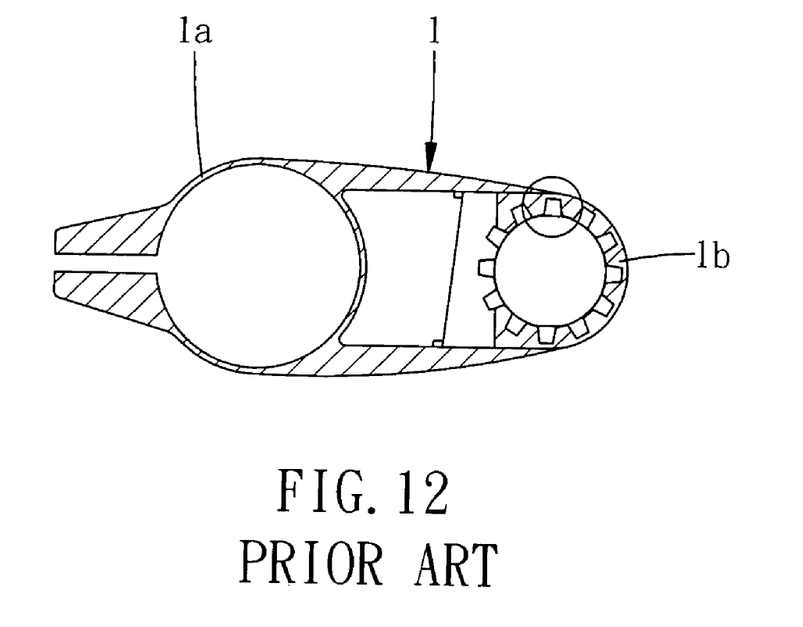
FIG. 12 is a top plan cross-sectional assembly view of the conventional lock fixing device as shown in FIG. 11.
Figure 13:
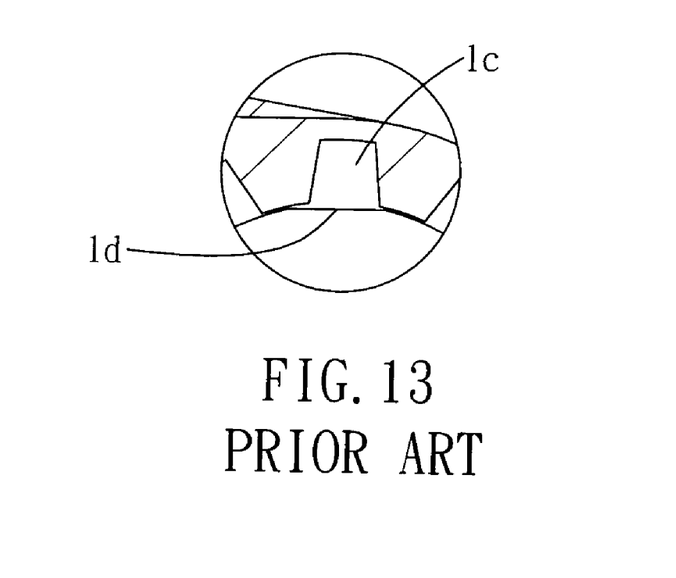
FIG. 13 is a partially enlarged view of the conventional lock fixing device as shown in FIG. 12.
Figure 14:
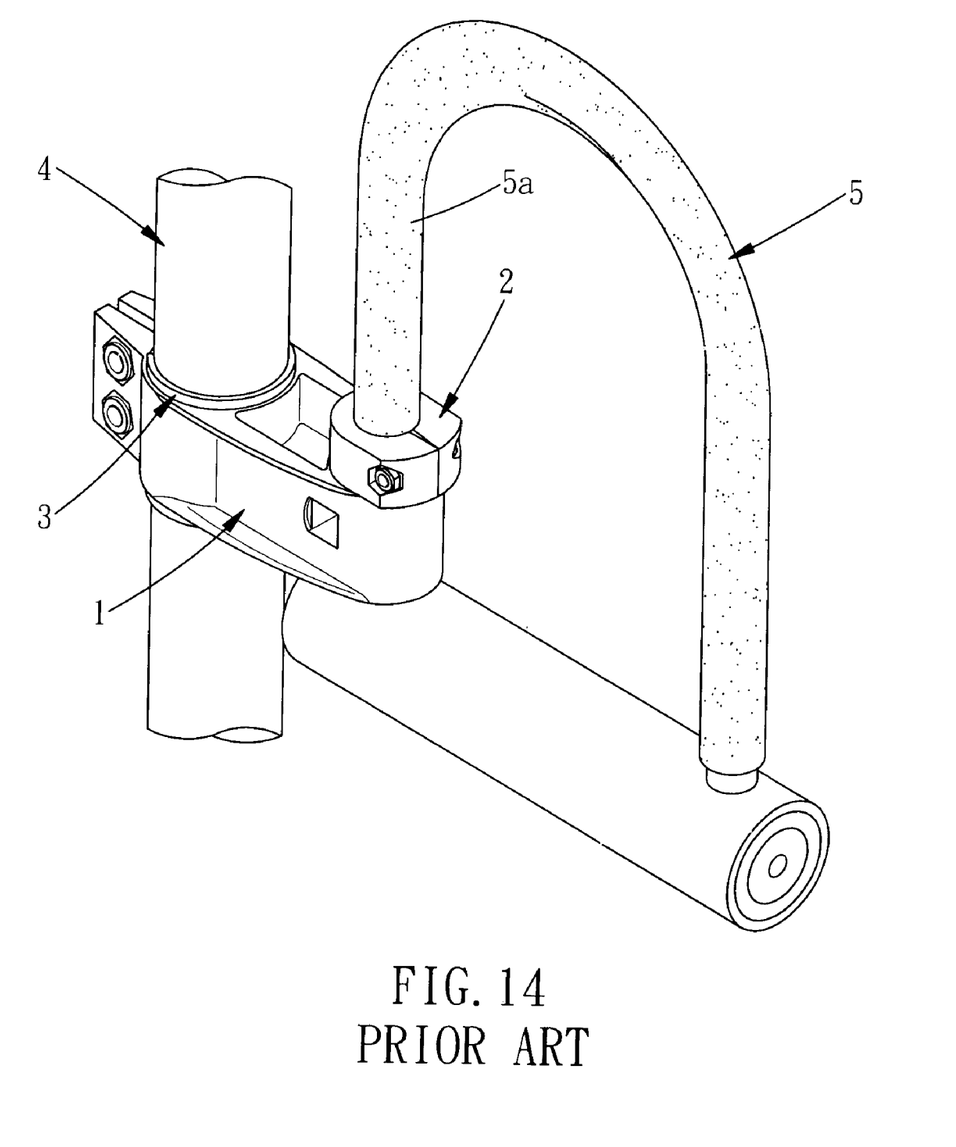
FIG. 14 is a perspective assembly view of the conventional lock fixing device in accordance with the prior art.

In assembly, referring to FIGS. 8–10 with reference to FIGS. 1–7, the C-shaped bushing 60 is initially mounted on the seat tube 70 of the bicycle as shown in FIGS. 1 and 2. Then, the first clamping plate 11 of the fastening seat 10 is mounted on the C-shaped bushing 60, with each of the two dovetailed ribs 61 of the C-shaped bushing 60 being inserted into a respective one of the two dovetailed grooves 111 of the first clamping plate 11 of the fastening seat 10. Then, the second clamping plate 12 is combined with the first clamping plate 11 by the bolts 14 and the nuts 15, so that the fastening seat 10 is fixed on the seat tube 70 of the bicycle as shown in FIGS. 1 and 2.

Then, the mounting tube 30 is mounted on an end of an inverted U-shaped bar 81 of the lock 80 of the bicycle, and the C-shaped clamping portion 31 of the mounting tube 30 is clamped by bolts 34 and nuts 35, so that the mounting tube 30 is fixed on the bar 81 of the lock 80. Then, the mounting tube 30 is inserted into the tubular body 21 of the support seat 20. At this time, the mounting tube 30 can be rotated relative to the tubular body 21 of the support seat 20 to a determined angle as shown in FIG. 2.

Then, the mounting tube 30 is moved in the tubular body 21 of the support seat 20 as shown in FIG. 8, and the locking rib 5131 of the drive handle 51 of the drive unit 50 is pressed outward by the outer wall of the mounting tube 30. Then, the mounting tube 30 is further inserted into the tubular body 21 of the support seat 20 to move from the position as shown in FIG. 8 to the position as shown in FIG. 9, so that the positioning blocks 212 of the support seat 20 are positioned in the positioning recesses 33 of the mounting tube 30 and the locking rib 5131 of the drive handle 51 of the drive unit 50 is locked in the positioning groove 32 of the mounting tube 30 by the restoring force of the torsion spring 52.

As shown in FIG. 9, the support seat 20 is pulled to move away from the fastening seat 10, to detach the positioning teeth 222 of the inner tube 22 of the support seat 20 from the positioning teeth 1123 of the outer tube 112 of the fastening seat 10, so that the inner tube 22 of the support seat 20 can be rotated relative to the outer tube 112 of the fastening seat 10 and the support seat 20 can be rotated relative to the fastening seat 10 so as to adjust the inclined angle of the support seat 20 relative to the fastening seat 10. After adjustment of the angle, the support seat 20 is pulled to move toward the fastening seat 10 by the restoring force of the compression spring 41, so that the positioning teeth 222 of the inner tube 22 of the support seat 20 mesh with the positioning teeth 1123 of the outer tube 112 of the fastening seat 10 again, and the support seat 20 is fixed the fastening seat 10 without rotation.

As shown in FIG. 10, the user can exert a force on the operation portion 512 of the drive handle 51 of the drive unit 50 to drive the drive handle 51 of the drive unit 50 to move outward from the tubular body 21 of the support seat 20, thereby detaching the locking rib 5131 of the drive handle 51 of the drive unit 50 from the positioning groove 32 of the mounting tube 30, so that the mounting tube 30 together with the lock 80 can be detached from the tubular body 21 of the support seat 20.

Accordingly, the lock fixing device in accordance with the preferred embodiment of the present invention has the following advantages.

1. The inclined angle of the support seat 20 relative to the fastening seat 10 can be adjusted easily and arbitrarily, thereby facilitating assembly and disassembly of the lock 80.

2. The positioning blocks 212 of the support seat 20 are positioned in the positioning recesses 33 of the mounting tube 30 and the locking rib 5131 of the drive handle 51 of the drive unit 50 is locked in the positioning groove 32 of the mounting tube 30, so that the mounting tube 30 is fixed on the support seat 20 rigidly and stably without detachment.

3. After the mounting tube 30 is inserted into the tubular body 21 of the support seat 20, the mounting tube 30 can be rotated relative to the support seat 20 to a determined angle as shown in FIG. 2, thereby facilitating assembly and disassembly of the lock 80.

4. Each of the two dovetailed ribs 61 of the C-shaped bushing 60 is secured in a respective one of the two dovetailed grooves 111 of the first clamping plate 11 of the fastening seat 10, so that the C-shaped bushing 60 is combined with the fastening seat 10 rigidly and stably without detachment.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. A lock fixing device, comprising a fastening seat, a support seat, a mounting tube, an elastic unit, a drive unit, and a C-shaped bushing, wherein:
   the fastening seat includes a first clamping plate having an outer periphery formed with an outer tube, and a second clamping plate combined with the first clamping plate;
   the support seat is mounted on the fastening seat and includes a tubular body and an inner tube extended from an outer wall of the tubular body and rotatably mounted in the outer tube of the fastening seat;
   the mounting tube is movably mounted on the tubular body of the support seat;
   the elastic unit is mounted between the fastening seat and the support seat;
   the drive unit is mounted on the support seat and includes a drive handle pivotally mounted on the tubular body of the support seat; and
   the C-shaped bushing is mounted in the fastening seat.

2. The lock fixing device in accordance with claim 1, wherein the second clamping plate has a first end pivotally mounted on a first end of the first clamping plate by a pivot pin and a second end fixedly mounted on a second end of the first clamping plate by bolts and nuts.

3. The lock fixing device in accordance with claim 1, wherein the first clamping plate has an inner periphery formed with two longitudinal dovetailed grooves, and the C-shaped bushing has an outer wall formed with two longitudinal dovetailed ribs each secured in a respective one of the two dovetailed grooves of the first clamping plate of the fastening seat.

4. The lock fixing device in accordance with claim 1, wherein the outer tube of the fastening seat has an inner portion formed with a circular hole communicating with the outer tube and a hexagonal hole communicating with the circular hole and the inner periphery of the first clamping plate, the inner tube of the support seat has an inner portion formed with a stepped hole communicating with the circular hole of the outer tube of the fastening seat.

5. The lock fixing device in accordance with claim 4, wherein the elastic unit includes a locking nut mounted in the hexagonal hole of the outer tube of the fastening seat, a locking bolt extended through the stepped hole of the inner tube of the support seat and the circular hole of the outer tube of the fastening seat and screwed into the locking nut so that the fastening seat is combined with the support seat, and a compression spring mounted on the locking bolt and urged between a wall of the stepped hole of the inner tube of the support seat and a head of the locking bolt.

6. The lock fixing device in accordance with claim 1, wherein the outer tube of the fastening seat has an inner portion having a periphery provided with a plurality of equally spaced protruding positioning teeth, and the inner tube of the support seat has an end face having a periphery provided with a plurality of equally spaced protruding positioning teeth meshing with the positioning teeth of the outer tube of the fastening seat in a staggered manner.

7. The lock fixing device in accordance with claim 1, wherein the tubular body of the support seat has an inner wall having a lower section formed with a plurality of equally spaced protruding positioning blocks, and the mounting tube has a lower section having a periphery formed with a plurality of equally spaced positioning recesses to receive the positioning blocks of the tubular body of the support seat.

8. The lock fixing device in accordance with claim 1, wherein the mounting tube has an upper section formed with a C-shaped clamping portion.

9. The lock fixing device in accordance with claim 1, wherein the tubular body of the support seat has a periphery formed with a through hole, the mounting tube has a lower section having a periphery formed with an annular positioning groove, and the drive handle of the drive unit has a mediate section provided with a protruding locking rib extended into the through hole of the tubular body and locked in the positioning groove of the mounting tube.

10. The lock fixing device in accordance with claim 9, wherein the mediate section of the drive handle of the drive unit has an inner side formed with an arcuate recess, and the locking rib of the drive handle is formed on a lower portion of the arcuate recess.

11. The lock fixing device in accordance with claim 1, wherein the locking rib of the drive handle has an arcuate tapered shape.

12. The lock fixing device in accordance with claim 1, wherein the outer wall of the tubular body of the support seat is formed with two pivot ears, and the drive handle of the drive unit has a first end provided with two pivot plates pivotally mounted between the two pivot ears of the tubular body of the support seat by a pivot shaft.

13. The lock fixing device in accordance with claim 12, wherein the drive handle of the drive unit has a second end provided with an operation portion.

14. The lock fixing device in accordance with claim 12, wherein the drive unit further includes a torsion spring mounted on the pivot shaft and having a first end urged on the drive handle and a second end urged on the tubular body of the support seat.

15. The lock fixing device in accordance with claim 1, wherein the first clamping plate is arc-shaped.

16. The lock fixing device in accordance with claim 1, wherein the second clamping plate is arc-shaped.

* * * * *